(12) United States Patent
Onishi et al.

(10) Patent No.: US 9,802,395 B2
(45) Date of Patent: Oct. 31, 2017

(54) SYNTHETIC RESIN LAMINATE

(71) Applicants: MITSUBISHI GAS CHEMICAL COMPANY, INC., Tokyo (JP); MGC FILSHEET CO., LTD., Saitama (JP)

(72) Inventors: Takeshi Onishi, Tokyo (JP); Yasuyoshi Nakayasu, Tokyo (JP); Kishin Ozawa, Osaka (JP)

(73) Assignees: MITSUBISSHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 0 days.

(21) Appl. No.: 15/104,397

(22) PCT Filed: Dec. 17, 2014

(86) PCT No.: PCT/JP2014/083375
§ 371 (c)(1),
(2) Date: Jun. 14, 2016

(87) PCT Pub. No.: WO2015/093516
PCT Pub. Date: Jun. 25, 2015

(65) Prior Publication Data
US 2016/0311204 A1    Oct. 27, 2016

(30) Foreign Application Priority Data
Dec. 18, 2013 (JP) ................. 2013-261731

(51) Int. Cl.
B32B 27/08 (2006.01)
C09D 4/00 (2006.01)
C08F 220/18 (2006.01)
C09D 183/06 (2006.01)
B32B 27/30 (2006.01)
B32B 27/36 (2006.01)
C08L 69/00 (2006.01)
B32B 27/06 (2006.01)
C08L 33/12 (2006.01)

(52) U.S. Cl.
CPC ............. B32B 27/08 (2013.01); B32B 27/06 (2013.01); B32B 27/30 (2013.01); B32B 27/308 (2013.01); B32B 27/36 (2013.01); C08F 220/18 (2013.01); C08L 33/12 (2013.01); C08L 69/00 (2013.01); C09D 4/00 (2013.01); C09D 183/06 (2013.01); B32B 2307/306 (2013.01); B32B 2307/308 (2013.01); B32B 2307/536 (2013.01); B32B 2307/734 (2013.01); B32B 2405/00 (2013.01)

(58) Field of Classification Search
None
See application file for complete search history.

(56) References Cited

U.S. PATENT DOCUMENTS

| | | | | | |
|---|---|---|---|---|---|
| 4,439,494 A | * | 3/1984 | Olson | ...................... | C08J 7/047 427/385.5 |
| 5,759,689 A | * | 6/1998 | Sieloff | ...................... | C07C 49/83 428/412 |
| 2007/0100088 A1 | * | 5/2007 | Gallucci | ...................... | C08L 67/03 525/446 |
| 2010/0152357 A1 | * | 6/2010 | Kwon | ...................... | C08L 33/08 524/502 |
| 2010/0197850 A1 | | 8/2010 | Kim et al. | | |
| 2011/0040019 A1 | | 2/2011 | Kwon et al. | | |
| 2014/0371375 A1 | * | 12/2014 | Chung | ...................... | C08L 33/10 524/502 |
| 2015/0017408 A1 | | 1/2015 | Aoki et al. | | |
| 2015/0111015 A1 | | 4/2015 | Hino et al. | | |

FOREIGN PATENT DOCUMENTS

| | | | |
|---|---|---|---|
| JP | 2006-103169 | | 4/2006 |
| JP | 2007-237700 | | 9/2007 |
| JP | 2010-167659 | | 8/2010 |
| JP | 2011-500914 | | 1/2011 |
| JP | 2011-513575 | | 4/2011 |
| KR | 20120098485 A | * | 9/2012 |
| WO | 2008/047940 | | 4/2008 |
| WO | WO2013094898 A1 | * | 6/2013 |
| WO | 2013/125500 | | 8/2013 |
| WO | 2013/172381 | | 11/2013 |

OTHER PUBLICATIONS

Machine_English_translation_KR_20120098485_A; Resin Plate for Lower Electrode Substrate; Sep. 5, 2012; KIPO.*
International Search Report issued in Japanese Patent Application No. PCT/JP2014/083375, dated Mar. 31, 2015.

* cited by examiner

*Primary Examiner* — Tahseen N Khan
(74) *Attorney, Agent, or Firm* — Greenblum & Bernstein, P.L.C.

(57) ABSTRACT

The present invention provides a synthetic resin laminate, which is excellent in terms of shape stability in a high-temperature or high-humidity environment, surface hardness, heat resistance, coating adhesion and the like. The synthetic resin laminate is formed by laminating a resin layer (A) including 5% to 55% by mass of a (meth)acrylate copolymer (C) and 95% to 45% by mass of a polycarbonate (D) on one surface or both surfaces of a base material layer (B) comprising polycarbonate, wherein the synthetic resin laminate is characterized: in that the (meth)acrylate copolymer (C) includes an aromatic (meth)acrylate unit (c1) and a methyl methacrylate unit (c2) at a mass ratio (c1/c2) of 5 to 80/20 to 95; in that the mass average molecular weight of the (meth)acrylate copolymer (C) is 5,000 to 30,000; and in that the viscosity average molecular weight of the polycarbonate (D) is 21,000 to 40,000.

12 Claims, No Drawings

SYNTHETIC RESIN LAMINATE

TECHNICAL FIELD

The present invention relates to a synthetic resin laminate, and specifically, to a synthetic resin laminate for use in transparent substrate materials or transparent protective materials, wherein the synthetic resin laminate has a layer comprising a polycarbonate resin and a resin layer comprising a specific (meth)acrylate copolymer and a polycarbonate resin, and is excellent in terms of shape stability in a high-temperature or high-humidity environment, surface hardness, impact resistance, weather resistance, coating adhesion, and heat resistance.

BACKGROUND ART

A polycarbonate resin plate is excellent in terms of transparency, impact resistance and heat resistance, and thus, it is used for soundproof walls, carports, signboards, glazing materials, lighting apparatuses, etc. However, such a polycarbonate resin plate is disadvantageous in that it is easily damaged because of its low surface hardness, and thus, its intended use is limited.

Patent Literature 1 proposes a method of coating the surface of the plate with a UV-curable resin or the like, and a method of performing hard coating on a substrate, to which a polycarbonate resin and an acrylic resin have been co-extruded, in order to improve the above-mentioned disadvantage of the polycarbonate resin plate.

However, such a polycarbonate resin cannot satisfy a required pencil hardness only by the hard coating of the surface thereof, and thus, it cannot be used for a purpose for which the surface hardness is required.

Moreover, in the method of coating an acrylic resin on a surface layer, since surface hardness is improved to a certain extent, it may have a wide application range such as a front plate for information display equipment. However, according to this method, there may be a case where a large warp is generated due to a difference in water absorption properties between an acrylic resin and a polycarbonate resin in a two-layer structure consisting of the two different materials, or a difference in heat resistance including a glass transition temperature as a representative example. Accordingly, this method is inconvenient for intended uses in which environmental changes are generated.

Patent Literature 2 discloses, as a method of suppressing warp, a laminate formed by laminating a resin having a low water absorption percentage on a polycarbonate resin. However, the result 40° C./90% obtained in environmental testing is insufficient as conditions for high temperature and high humidity, and thus, it cannot be said that the performance required for low warpage properties is sufficiently evaluated. In addition, the MS resin used in this patent literature is generally considered to have low heat resistance, and thus, there may be a case where this causes a problem upon post-processing.

Moreover, as a method of suppressing warp, there is a laminate formed by laminating an acrylic resin layer on both surfaces of a polycarbonate resin layer. However, when surface impact is given to one surface of the laminate, a crack is easily generated in the acrylic resin layer on the other surface, and thus, this method may be problematic for some usage.

PRIOR ART DOCUMENTS

Patent Documents

Patent Literature 1: JP Patent Publication (Kokai) No. 2006-103169 A
Patent Literature 2: JP Patent Publication (Kokai) No. 2010-167659 A

SUMMARY OF INVENTION

Technical Problem

Under the aforementioned circumstances, it is an object of the present invention to provide a synthetic resin laminate for use in transparent substrate materials or transparent protective materials, which is excellent in terms of shape stability in a high-temperature or high-humidity environment, surface hardness, impact resistance, weather resistance, heat resistance, and coating adhesion.

Means to Solve the Problem

As a result of intensive studies directed towards achieving the aforementioned object, the present inventors have found that a synthetic resin laminate having the aforementioned properties can be obtained by laminating a resin layer comprising a specific (meth)acrylate copolymer and a polycarbonate resin on at least one surface of a layer comprising a polycarbonate resin, thereby completing the present invention.

Specifically, the present invention provides the following synthetic resin laminate and a transparent material comprising the synthetic resin laminate.

<1> A synthetic resin laminate, which is formed by laminating a resin layer (A) comprising 5% to 55% by mass of a (meth)acrylate copolymer (C) and 95% to 45% by mass of a polycarbonate (D) on one surface or both surfaces of a base material layer (B) comprising polycarbonate, wherein the synthetic resin laminate is characterized:

in that the (meth)acrylate copolymer (C) comprises an aromatic (meth)acrylate unit (c1) represented by the following formula (1) and a methyl methacrylate unit (c2) at a mass ratio (c1/c2) of 5 to 80/20 to 95, and the mass average molecular weight of the (meth)acrylate copolymer (C) is 5,000 to 30,000,

[Formula 1]

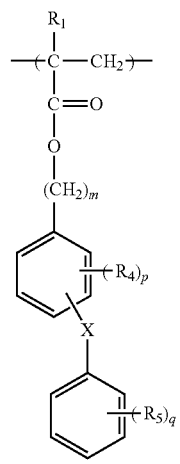

(1)

wherein X represents a divalent group selected from the group consisting of a single bond, —C(R2)(R3)-, —C(=O)—, —O—, —OC(=O)—, —OC(=O)O—, —S—, —SO—, —SO$_2$—, and any given combination thereof (wherein R2 and R3 each independently represent a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group, or a phenylphenyl group; R2 and R3 may be connected with each other to form a cyclic alkyl group containing 3 to 10 carbon atoms, together with carbon atoms to which they bind);

R1 represents a hydrogen atom or a methyl group;

R4 and R5 each independently represent a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group, or a phenylphenyl group;

m represents an integer of 1 to 10; p represents an integer of 0 to 4; and q represents an integer of 0 to 5; and in that the viscosity average molecular weight of the polycarbonate (D) is 21,000 to 40,000.

<2> The synthetic resin laminate according to the above <1>, wherein the glass transition point of the resin layer (A) is 110° C. to 135° C.

<3> The synthetic resin laminate according to the above <1> or <2>, wherein the water absorption percentage of the resin layer (A) is 0.05% to 0.5%.

<4> The synthetic resin laminate according to any one of the above <1> to <3>, wherein the thickness of the resin layer (A) is 10 to 250 μm, the total thickness (X) of the synthetic resin laminate is 0.1 to 2.0 mm, and the thickness ratio (A)/(X) is 0.01 to 0.5.

<5> The synthetic resin laminate according to any one of the above <1> to <4>, wherein the viscosity average molecular weight of the base material layer (B) is 21,000 to 40,000.

<6> The synthetic resin laminate according to any one of the above <1> to <5>, wherein the resin layer (A) and/or the base material layer (B) comprise an ultraviolet absorber.

<7> The synthetic resin laminate according to any one of the above <1> to <6>, wherein the surface of the resin layer (A) is subjected to a hard coating treatment.

<8>
The synthetic resin laminate according to any one of the above <1> to <6>, wherein the surface of the resin layer (A) and the surface of the base material layer (B) are subjected to a hard coating treatment.

<9>
The synthetic resin laminate according to any one of the above <1> to <8>, wherein any one or more of an antireflection treatment, an antifouling treatment, an anti-fingerprint treatment, an antistatic treatment, a weather resistance treatment, an anti-glare treatment, and a vapor deposition treatment are performed on one surface or both surfaces of the synthetic resin laminate.

<10> A transparent substrate material comprising the synthetic resin laminate according to any one of the above <1> to <9>.

<11>
A transparent protective material comprising the synthetic resin laminate according to any one of the above <1> to <9>.

<12>
The synthetic resin laminate according to any one of the above <1> to <9>, which is used for the electrode substrate of a touch panel.

Effects of Invention

According to the present invention, a synthetic resin laminate, which is excellent in terms of shape stability in a high-temperature or high-humidity environment, surface hardness, impact resistance, weather resistance, heat resistance and coating adhesion, is provided, and the synthetic resin laminate is used as a transparent substrate material, a transparent protective material, or the like. Specifically, the present synthetic resin laminate is preferably used in portable display devices such as mobile phone terminals, portable electronic playground equipment, portable information terminals or mobile PC, installation-type display devices such as liquid crystal monitors for laptop PC and desktop PC or liquid crystal televisions, etc.

MODE FOR CARRYING OUT THE INVENTION

Hereinafter, the present invention will be described in detail in production examples, examples, and the like, as described below. However, these production examples, examples, and the like are not intended to limit the scope of the present invention. These examples can be modified, as appropriate, unless they largely deviate from the gist of the present invention.

The synthetic resin laminate of the present invention is formed by laminating a resin layer (A) comprising 5% to 55% by mass of a (meth)acrylate copolymer (C) and 95% to 45% by mass of a polycarbonate (D) on one surface or both surfaces of a base material layer (B) comprising polycarbonate, and the present synthetic resin laminate is characterized in that the (meth)acrylate copolymer (C) comprises an aromatic (meth)acrylate unit (c1) represented by the following structural formula (1) and a methyl methacrylate unit (c2) at a mass ratio (c1/c2) of 5 to 80/20 to 95, in that the mass average molecular weight of the (meth)acrylate copolymer (C) is 5,000 to 30,000, and in that the viscosity average molecular weight of the polycarbonate (D) is 21,000 to 40,000.

[Formula 2]

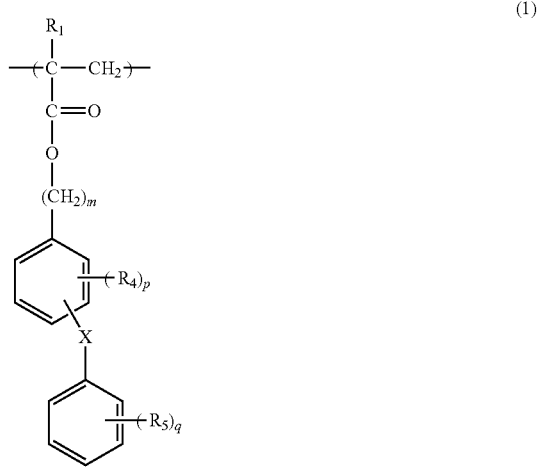

In the synthetic resin laminate of the present invention, in order to increase the surface hardness of a polycarbonate resin, a resin layer (A) comprising a specific (meth)acrylate copolymer and a polycarbonate is laminated on one surface or both surfaces of a base material layer (B) comprising polycarbonate. If such a resin layer (A) is laminated on only one surface, when surface impact is given to the side of the resin layer (A) that is a hard structure, the opposite surface that is the base material layer (B) having a soft structure alleviates the impact, and thereby, destruction caused by the impact hardly occurs. In addition, by laminating the resin layer (A) having a water absorption percentage that is close to that of polycarbonate on the surface, a problem regarding warp that occurs upon lamination of a resin having a different water absorption percentage is also alleviated. Specifically, the saturated water absorption percentage of the resin layer B is 0.2% to 0.4%, for example, approximately 0.3%, whereas the saturated water absorption percentage of the resin layer A is preferably 0.05% to 0.5%, more preferably 0.1% to 0.45%, and even more preferably 0.1% to 0.4%.

Accordingly, the difference in the saturated water absorption percentage between the resin layer A and the resin layer B is preferably 0.20% to 0.25%, and more preferably approximately 0.15% to 0.10%.

Moreover, a laminate formed by laminating the resin layer (A) on both surface of the base material layer (B) is also excellent in terms of impact resistance because the resin layer (A) comprises a polycarbonate. As such, even if surface impact is given to one surface of the laminate, the opposite surface is hardly destroyed by the impact. Furthermore, since the same type of resin is laminated on both surfaces, the formed laminate has a symmetric structure, and generation of warp is further suppressed, and thus, it is preferable.

The method for forming the synthetic resin laminate of the present invention is not particularly limited. Examples of the method for forming the synthetic resin laminate of the present invention include various methods, such as a method which comprises laminating a resin layer (A) and a base material layer (B), in which the two layers have been individually formed, and then subjecting the laminated layers to thermocompression bonding, a method which comprises laminating a resin layer (A) and a base material layer (B), in which the two layers have been individually formed, and then adhering them to each other using an adhesive, a method of subjecting a resin layer (A) and a base material layer (B) to co-extrusion molding, and a method of subjecting a polycarbonate resin that is a main component of a base material layer (B) to in-mold molding, using a resin layer (A) that has previously been formed, and then integrating them. From the viewpoint of production costs and productivity, the method involving co-extrusion molding is preferable.

In the present invention, the polycarbonate used as a base material layer (B) and the polycarbonate (D) used as a resin layer (A) are not particularly limited, as long as they comprise the unit —[O—R—OCO]— (wherein R comprises an aliphatic group, an aromatic group, or both of the aliphatic group and the aromatic group, and further has a linear structure or a branched structure) comprising a carbonic acid ester bond in a molecular main chain thereof. For example, an aromatic polycarbonate resin or an alicyclic polycarbonate resin is preferably used.

The method for producing the polycarbonate used as a base material layer (B) and the polycarbonate (D) used as a resin layer (A) in the present invention can be selected, as appropriate, from known methods such as a phosgene method (an interfacial polymerization method) and a transesterification method (a melting method), depending on the type of a monomer used.

The (meth)acrylate copolymer (C) used in the present invention consists of the aromatic (meth)acrylate unit (c1) represented by the above structural formula (1) and the methyl methacrylate unit (c2). In the present invention, the term "(meth)acrylate" indicates acrylate or methacrylate.

Examples of the aromatic (meth)acrylate unit (c1) represented by the above structural formula (1) include 2-phenylbenzyl (meth)acrylate, 3-phenylbenzyl (meth)acrylate, 4-phenylbenzyl (meth)acrylate; and 4-biphenylbenzyl (meth)acrylate. Among others, 4-phenylbenzyl (meth)acrylate is particularly preferable. By comprising the aromatic (meth)acrylate unit (c1), the transparency of a molded product that is mixed with the polycarbonate resin can be improved.

Examples of the monomer constituting the methyl methacrylate unit (c2) include: methacrylates such as methyl methacrylate, ethyl methacrylate, butyl methacrylate, propyl methacrylate, and 2-ethylhexyl methacrylate; and acrylates such as methyl acrylate, ethyl acrylate, butyl acrylate, propyl acrylate, 2-ethylhexyl acrylate, and glycidyl acrylate. Among others, methyl methacrylate is particularly preferable.

The methyl methacrylate unit (c2) has the effect of providing good dispersion with a polycarbonate-based resin, and it transfers to the surface of a molded product. Accordingly, the methyl methacrylate unit (c2) can improve the surface hardness of such a molded product.

The (meth)acrylate copolymer (C) comprises 5% to 80% by mass of the aromatic (meth)acrylate unit (c1) and 20% to 95% by mass of the methyl methacrylate unit (c2) (wherein the total of (c1) and (c2) is 100% by mass). If the content of the aromatic (meth)acrylate unit (c1) in the (meth)acrylate copolymer (C) is 10% by mass or more, transparency is maintained in a region to which the (meth)acrylate copolymer (C) is highly added. If the content of the aromatic (meth)acrylate unit (c1) is 80% by mass or less, the compatibility with the polycarbonate resin is not too high, and the transfer ability to the surface of a molded product is not reduced. Thus, the surface hardness is not decreased.

The mass average molecular weight of the (meth)acrylate copolymer (C) is 5,000 to 30,000, preferably 8,000 to 25,000, and more preferably 8,000 to 15,000. When the (meth)acrylate copolymer (C) has a mass average molecular weight of 5,000 to 30,000, it has a good compatibility with polycarbonate, and is excellent in terms of the effect of improving the surface hardness. It is to be noted that the mass average molecular weight (Mw), number average molecular weight (Mn) and molecular weight distribution (Mw/Mn) of the (meth)acrylate copolymer (C) can be measured by gel permeation chromatography, in which THF or chloroform is used as a solvent.

In the present invention, the method for producing the resin layer (A) is not particularly limited, and there can be applied a known method, such as a method which comprises previously mixing necessary components using a mixing machine such as a tumbler, a Henschel mixer or a Super mixer, and then melting and kneading the obtained mixture using a machine such as a Banbury mixer, a roll, a Brabender, a single-screw extruder, a twin-screw extruder or a pressure kneader.

In the present invention, the composition ratio between the (meth)acrylate copolymer (C) and the polycarbonate (D) is 95% to 45% by mass of the component (D) to 5% to 55% by mass of the component (C). The composition ratio is preferably 80% to 50% by mass of the component (D) to 20% to 50% by mass of the component (C). The composition ratio is more preferably 70% to 50% by mass of the component (D) to 30% to 50% by mass of the component (C). By setting the composition ratio in this range, a resin layer (A), which has a good balance in terms of various physical properties such as surface hardness, impact resistance and water absorption percentage, while maintaining transparency, can be obtained.

In the present invention, the viscosity average molecular weight of the polycarbonate (D) is determined, based on the ease of mixing with (dispersion in) the (meth)acrylate copolymer (C), the ease of the production of the resin layer (A), and the like. That is to say, if the viscosity average molecular weight of the polycarbonate (D) is too large, problems occur, such that a difference in the melt viscosity between the component (D) and the component (C) becomes too large, and as a result, the mixing (dispersion) of the two components is deteriorated, and the transparency of the resin layer (A) is also deteriorated, or such that stable melting and kneading cannot be continuously carried out. In contrast, if the viscosity average molecular weight of the polycarbonate (D) is too small, another problem occurs such that the strength of the resin layer (A) is decreased, and as a result, the impact resistance of a synthetic resin laminate is also reduced. The viscosity average molecular weight of the polycarbonate (D) is preferably in the range of 21,000 to 40,000. It is more preferably in the range of 23,000 to 38,000. It is even more preferably in the range of 24,000 to 36,000. The polycarbonate (D) is particularly preferably an aromatic polycarbonate resin. In particular, BPA- and BPC-type homopolymers are desirable.

In the present invention, the glass transition point of the resin layer (A) has an influence on the heat resistance of a synthetic resin laminate. That is to say, if the glass transition point is too low, the heat resistance of the synthetic resin laminate is decreased, and thus, it is not preferable. On the other hand, if the glass transition point is too high, there may be a case where an excessive heat source is required upon lamination of the resin layer (A), and thus, it is not preferable. The glass transition point of the resin layer (A) is preferably 110° C. to, 135° C. It is more preferably 115° C. to 135° C. It is even more preferably 120° C. to 135° C.

In the present invention, the water absorption percentage of the resin layer (A) has an influence on the deformation amount (warp amount) of the synthetic resin laminate, when the synthetic resin laminate is exposed to high-temperature and high-humidity conditions, and impact resistance. That is, if the water absorption percentage is too high, the deformation amount (g) is increased, and thus, it is not preferable. On the other hand, small, if the water absorption percentage is too low, the magnitude relation of the water absorption percentage of the base material layer (B) is reversed, and there may be a case where the deformation amount (h) that is in the direction opposite to the aforementioned deformation would be generated; and thus, it is not preferable. The water absorption percentage of the resin layer (A) is preferably 0.05% to 0.5%. It is more preferably 0.1% to 0.45%. It is even more preferably 0.1% to 0.4%.

In the present invention, the thickness of the resin layer (A) has an influence on the surface hardness or impact resistance of a synthetic resin laminate. That is to say, if the thickness of the resin layer (A) is too small, the surface hardness is reduced, and thus, it is not preferable. On the other hand, if the thickness of the resin layer (A) is too large, the impact resistance is deteriorated, and thus, it is not preferable. The thickness of the resin layer (A) is preferably 10 to 250 μm. It is more preferably 30 to 200 μm. It is even more preferably 40 to 150 μm.

In the present invention, the total (entire) thickness of a synthetic resin laminate has an influence on the deformation amount (warp amount) of the synthetic resin laminate, when the synthetic resin laminate is exposed to high-temperature and high-humidity conditions, and impact resistance. That is, if the total thickness is too small, the deformation amount (warp amount) of the synthetic resin laminate is increased when it is exposed to high-temperature and high-humidity conditions, and impact resistance is reduced. When the total thickness is large, the deformation amount (warp amount) of the synthetic resin laminate is decreased when it is exposed to high-temperature and high-humidity conditions, and impact resistance is ensured. However, when the total thickness is unnecessarily large, an excessive amount of raw material must be used for the polycarbonate (D), and it is not economically efficient. The total thickness of the synthetic resin laminate is preferably 0.1 to 2.0 mm. It is more preferably 0.3 to 2.0 mm. It is even more preferably 0.5 to 1.5 mm.

The ratio ((A)/(X)) between the thickness of the resin layer (A) and the total thickness (X) of the synthetic resin laminate has an influence on the surface hardness and impact resistance of the synthetic resin laminate. That is, if the thickness ratio is too low, the surface hardness is reduced, and thus, it is not preferable. On the other hand, the thickness ratio is too high, the impact resistance is deteriorated, and thus, it is not preferable. The thickness ratio is preferably 0.01 to 0.5. It is more preferably 0.015 to 0.4. It is even more preferably 0.02 to 0.3.

The warp amount of a laminate with a thickness of 1.2 mm or less, which has been left at a temperature of 23° C. and at a relative humidity of 50% for 24 hours or longer, is 200 μm or less, and preferably 150 μm or less. The warp amount of a laminate with a thickness of 0.5 mm or less is 300 μm or less, and preferably 200 μm or less. Details of the temperature and humidity conditions and the measurement method will be described later. In addition, the warp amount of a laminate, which has been left for 24 hours or longer under the aforementioned conditions and then has been further left at a temperature of 85° C. and at a relative humidity of 85% for 120 hours, is 400 or less, and preferably 300 μm or less. The warp amount of a laminate with a thickness of 0.5 mm or less after completion of the aforementioned treatment, is 500 μm or less, and preferably 400 μm or less. As a specific example, the warp amount of a laminate with a thickness of 0.8 mm was 80 μm under the above-described high temperature and high humidity conditions.

In the present invention, the viscosity average molecular weight of the base material layer (B) has an influence on the impact resistance and molding conditions of a synthetic resin laminate. That is to say, if the viscosity average molecular weight is too low, the impact resistance of the synthetic resin laminate is reduced, and thus, it is not preferable. On the other hand, when the viscosity average molecular weight is too high, there may be a case where an excessive heat source is required upon lamination of the resin layer (A), and thus, it is not preferable. Moreover, since a high temperature is required for some molding methods, in such a case, the resin layer (A) is exposed to a high temperature, and as a result, it may affect the heat stability of the resin layer. The viscosity average molecular weight of the base material layer (B) is 21,000 to 40,000. It is preferably 18,000 to 40,000. It is more preferably 21,000 to 38,000. It is even more preferably 24,000 to 36,000.

In the present invention, an ultraviolet absorber can be mixed into the resin layer (A) and/or the base material layer (B). If the content of such an ultraviolet absorber is too low, light resistance becomes insufficient. On the other hand, if the content is too high, an excessive amount of ultraviolet absorber may be scattered due to a high temperature, depending on a molding method, and thereby it may cause a problem regarding contamination of the molding environment. The content percentage of the ultraviolet absorber is preferably 0% to 5% by mass, more preferably 0% to 3% by mass, and even more preferably 0% to 1% by mass. Examples of the ultraviolet absorber include: benzophenone-based ultraviolet absorbers such as 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, or 2,2',4,4'-tetrahydroxybenzophenone; benzotriazole-based ultraviolet absorbers such as 2-(2-hydroxy-5-methylphenyl)benzotriazole, 2-(2-hydroxy-3,5-di-t-butylphenyl)benzotriazole, 2-(2-hydroxy-3-t-butyl-5-methylphenyl)benzotriazole, or (2H-benzotriazol-2-yl)-4,6-bis(1-methyl-1-phenylethyl)phenol; benzoate-based ultraviolet absorbers such as phenyl salicylate or 2,4-di-t-butylphenyl-3,5-di-t-butyl-4-hydroxy benzoate; hindered amine-based ultraviolet absorbers such as bis(2,2,6,6-tetramethylpiperidin-4-yl) sebacate; and triazine-based ultraviolet absorbers such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, or 2,4-diphenyl-6-(2-hydroxy-4-benzyloxyphenyl)-1,3,5-triazine. The method of mixing such an ultraviolet absorber is not particularly limited, and a method of compounding the total amount of ultraviolet absorber, a method of dry-blending a master batch, a method of dry-blending the total amount of ultraviolet absorber, etc. can be used.

In the present invention, various types of additives can be mixed into the resin layer (A) and/or the base material layer (B), and the thus obtained layers can be used. Examples of the additive include an antioxidant, an anti-coloring agent, an antistatic agent, a releasing agent, a lubricant, a dye, a pigment, a plasticizer, a flame retardant, a resin modifier, a compatibilizer, and a reinforcing material such as an organic filler or an inorganic filler. The mixing method is not particularly limited, and a method of compounding the total amount of additives, a method of dry-blending a master batch, a method of dry-blending the total amount of additives, etc. can be used.

In the present invention, a hard coating treatment may be performed on the surfaces of the resin layer (A) and/or the base material layer (B), which are the surfaces of the laminate. For example, a hard-coated layer is formed by performing a hard coating treatment using a hard coating paint that is hardened using heat energy or light energy. Examples of the hard coating paint hardened using heat energy include polyorganosiloxane-based and crosslinked acryl-based thermosetting resin compositions. An example of the hard coating paint hardened using light energy is a light-setting resin composition formed by adding a photopolymerization initiator to a resin composition consisting of a monofunctional and/or polyfunctional acrylate monomer and/or oligomer.

In the present invention, an example of the hard coating paint hardened using heat energy, which is applied onto the resin layer (A), is a thermosetting resin composition, which is formed by adding 1 to 5 parts by weight of amine carboxylate and/or quaternary ammonium carboxylate (a13) to 100 parts by weight of a resin composition consisting of 100 parts by weight of organotrialkoxysilane (a11) and 50 to 200 parts by weight of a colloidal silica solution (a12) comprising 10% to 50% by weight of colloidal silica having a particle diameter of 4 td 20 nm.

In the present invention, an example of the hard coating paint hardened using light energy, which is applied onto the resin layer (A), is a light-setting resin composition, which is formed by adding 1 to 10 parts by weight of a photopolymerization initiator (a23) to 100 parts by weight of a resin composition consisting of 40% to 80% by weight of tris (acryloyloxyethyl) isocyanurate (a21) and 20% to 60% by weight of a bifunctional and/or trifunctional (meth)acrylate compound (a22) copolymerizable with the component (a21).

An example of the hard coating paint hardened using light energy, which is applied onto the base material layer (B) in the present invention, is a light-setting resin composition, which is formed by adding 1 to 10 parts by weight of a photopolymerization initiator (b3) to 100 parts by weight of a resin composition that consists of 20% to 60% by weight of 1,9-nonanediol diacrylate (b1), and 40% to 80% by weight of a compound (b2) consisting of a bi- or more-functional polyfunctional (meth)acrylate monomer and a bi- or more-functional polyfunctional urethane (meth)acrylate oligomer and/or a bi- or more-functional polyfunctional polyester (meth)acrylate oligomer and/or a bi- or more-functional polyfunctional epoxy (meth)acrylate oligomer, which are copolymerizable with the component (b1).

The method of applying a hard coating paint to the layer is not particularly limited in the present invention, and a known method can be used. Examples of such a known method include a spin-coating method, a dipping method, a spraying method, a slide coating method, a bar coating method, a roll coating method, a gravure coating method, a meniscus coating method, a flexographic printing method, a screen printing method, a beat coating method, and a brushing method.

For the purpose of improving the adhesiveness of the hard coat, before the hard coating treatment, a pre-treatment may be performed on a surface to be coated. Examples of such a pre-treatment include known methods such as a sandblasting method, a solvent treatment method, a corona discharge treatment method, a chromic acid treatment method, a flame treatment method, a hot air treatment method, an ozone treatment method, an ultraviolet treatment method, and a primer treatment method using a resin composition.

The materials used for each of the resin layer (A), the base material layer (B) and the hard coat in the present invention are preferably subjected to filtration purification involving a filter treatment. By purifying or laminating the material through a filter, a synthetic resin laminate having a few cases of poor appearance, such as foreign matters or defects, can be obtained. The filtration method is not particularly limited, and melt filtration, solution filtration, a combination thereof, or the like can be used.

The used filter is not particularly limited, and a known filter can be used. Such a filter can be used, as appropriate, depending on the used temperature, viscosity and filtration accuracy of each material. The material used for the filter is not particularly limited, and polypropylene, cotton, polyester, non-woven fabric of viscose rayon or glass fiber, roving yarn scroll, phenol resin-impregnated cellulose, metal fiber non-woven fabric sintered body, breaker plate, and a combination thereof, can be all used. In particular, taking into consideration heat resistance, durability and pressure resistance, a metal fiber non-woven fabric sintered type is preferable.

The filtration accuracy for the resins of the resin layer (A) and the base material layer (B) is 50 μm or less, preferably 30 μm or less, and more preferably 10 μm or less. In addition, since a hard coating agent is applied onto the outermost layer of the synthetic resin laminate, the filtration accuracy thereof is 20 μm or less, preferably 10 μm or less, and more preferably 5 μm or less.

For filtration of the resin layer (A) and the base material layer (B), it is preferable to use, for example, a polymer filter that is used for the melt filtration of a thermoplastic resin. The polymer filter is classified into a leaf disk filter, a candle filter, a pack disk filter, a cylindrical filter, etc., depending on the structure thereof. A leaf disk filter having a large effective filtration area is particularly preferable.

Any one or more of an antireflection treatment, an antifouling treatment, an antistatic treatment, a weather resistance treatment, an anti-glare treatment and a vapor deposition treatment can be performed on one surface or both surfaces of the synthetic resin laminate of the present invention. The methods of the antireflection treatment, antifouling treatment, antistatic treatment; weather resistance treatment, anti-glare treatment and vapor deposition treatment are not particularly limited, and known methods can be applied. Examples of the method include a method of applying a reflection-reducing paint to the synthetic resin laminate, a method of depositing a dielectric thin film, a method of applying an antistatic paint to the synthetic resin laminate, and a method of depositing an ITO film.

EXAMPLES

Hereinafter, the present invention will be specifically described in the following examples. However, these examples are not intended to limit the scope of the present invention.

The measurement of the physical properties of the laminated resins obtained in the production examples and evaluation of the synthetic resin laminates obtained in the examples and comparative examples were carried out as follows.

<Mass Average Molecular Weight>

On the basis of a calibration curve obtained by previously dissolving standard polystyrene in chloroform and then performing a measurement by gel permeation chromatography (GPC), both a (meth)acrylate copolymer and a polycarbonate resin were measured by GPC. By comparing the results between both components, the viscosity average molecular weight of each component was calculated. The GPC apparatus has the following configuration.
Apparatus: Wates 2690
Column: Shodex GPC KF-805L, 8ϕ×300 mm, two columns connected
Developing solvent: Chloroform
Flow rate: 1 ml/min
Temperature: 30° C.
Detector:
  UV . . . 486 nm polycarbonate
  RI . . . special acrylic material <Viscosity Average Molecular Weight>

A polycarbonate resin was dissolved in methylene chloride (concentration: 6.0 g/L (liter)), and thereafter, using a Ubbelohde viscometer, the specific viscosity ηsp) at 20° C. was measured. After that, a viscosity average molecular weight (Mv) was calculated according to the following formulae (2) and (3). In the following formulae, C indicates a concentration, and [η] indicates limiting viscosity.

[Expression 1]

$$\eta sp/C = [\eta](1+0.28\, \eta sp) \qquad (2)$$

$$[\eta] = 1.23 \times 10^{-4} Mv^{0.83} \qquad (3)$$

<Water Absorption Percentage>

Water absorption percentage was measured in accordance with Method A of JIS-K7209. First, a test piece with a size of 100 mm×100 mm×3.0 mm was prepared by injection molding, and it was placed in an oven of 50° C. and was then dried. Twenty-four hours later, the test piece was removed from the oven, and was then cooled in a desiccator whose temperature had been adjusted to 23° C. One hour later, the weight of the test piece was measured, and was then placed into water of 23° C. Then, twenty-four hours later, the test piece was removed from the water, and water on the surface was wiped out. Thereafter, the weight of the test piece was measured. A difference between the weight of the test piece after placing into water and the weight thereof immediately after drying was divided by the weight thereof immediately after drying, and the obtained value was multiplied by 100, thereby calculating a water absorption percentage (saturated water absorption percentage).

<Glass Transition Point>

In accordance with JIS-K7121, suitable amounts of individual material pellets were set into the thermal analysis device TG-DTA 2000SA manufactured by BRUKER, and the glass transition point Tg [° C.] was then measured by increasing the temperature at a rate of 10° C./min in a mitogen atmosphere.

<High-Temperature and High-Humidity Exposure Test>

A test piece was cut to a rectangle with a size of 100×60 mm. The test piece was set into a two-point supporting type holder, and it was then placed in an environmental testing machine, in which the temperature was set at 23° C. and the relative humidity was set at 50%, for 24 hours or more, so that the conditions were adjusted. Thereafter, warp was measured (before treatment).

Subsequently, the test piece was set into the holder, and was then placed in an environmental testing machine, in which the temperature was set at 85° C. and the relative humidity was set at 85%. The test piece was retained in that state for 120 hours. Thereafter, the test piece, together with the holder, was transferred into an environmental testing machine, in which the temperature was set at 23° C. and the relative humidity was set at 50%, and it was then retained in that state for 4 hours. After that, warp was measured again (after treatment).

For the measurement of warp, a three-dimensional shape measuring device equipped with an electric stage was used, and the removed test piece was horizontally placed on the measuring device in a convex state. Scanning was performed at intervals of 1 mm, and a raised portion in the center of the test piece was measured as a warp. The result obtained by the formula: (warp amount after the treatment)−(warp amount before the treatment) was evaluated as shape stability. With regard to a test piece with a thickness of 1.2 mm or less, the uncoated product and both surfaces-coated product thereof were considered to be satisfactory, when the shape change amount was 300 μm or less, and the one surface-coated product thereof was considered to be satisfactory, when the change amount was less than 1000 μm. However, with regard to a test piece with a thickness of 0.5 mm or less, the test piece was considered to be satisfactory, when the change amount was 500 μm or less. Regarding the one surface-coated product thereof, it was considered to be satisfactory, when the change amount was less than 1000 μm.

<Pencil Scratch Hardness Test>

A pencil was pressed against the surface of the resin layer (A) at an angle of 45 degrees and at a load of 750 g, while increasing the hardness thereof, in accordance with JIS K 5600-5-4. The highest hardness of the pencil, with which the surface of the resin layer was not damaged, was defined as pencil hardness. Regarding a test piece on which a hard coating treatment has not been performed, a pencil hardness of HB or harder is considered to be satisfactory. Regarding a test piece on which a hard coating treatment has been performed, a pencil hardness of H or harder is considered to be satisfactory.

<Impact Resistance Test>

A test piece was cut to a 80-mm square. The test piece was left in an environment in which the temperature was set at 23° C. and the relative humidity was set at 50% for 24 hours or longer, so that the conditions were adjusted. Thereafter, the test piece was immobilized on a circular flange with a diameter of 50 mm, with the base material layer (B) thereof up. A metal spindle with a tip radius of 2.5 mm was dropped on the base material layer (B), such that the tip portion of the spindle was crashed against the layer. The weight of the spindle was gradually increased from 40 g to 160 g, or the height from which the spindle was dropped was increased, so that the added dropping energy [J] was increased. The highest dropping energy [J], which did not cause destruction, was evaluated as impact resistance. With regard to test pieces with a thickness of 1 mm, which had not been coated with a hard coat, one surface of which had been coated with a hard coat, and both surfaces of which had been coated with a hard coat, the test pieces, which were not destroyed by a dropping energy of less than 0.9 J, were considered to be satisfactory. On the other hand, with regard to test pieces with a thickness of 0.5 mm, which had not been coated with a hard coat, one surface of which had been coated with a hard coat, and both surfaces of which had been coated with a hard coat, the test pieces, which were not destroyed by a dropping energy of less than 0.3 J, were considered to be satisfactory.

<Light Resistance Test>

The present test was carried out, using a test piece which had been coated with a hard coat a2 (see the after-mentioned Production Example 7). The test piece was cut to a rectangle with a size of 8×5 cm. The obtained test piece was left in an environment in which the temperature was set at 23° C. and the relative humidity was set at 50% for 24 hours or longer, so that the conditions were adjusted. Thereafter, using an adhesive tape made of aluminum, the test piece was adhered to an iron plate with the side of the resin layer (A) up, so that the central portion thereof was exposed to light. This test piece was set into a black box equipped with a UVB lamp (280 to 360 nm) with an output of 19 mW, and UVB was then applied to the test piece for 72 hours. Before and after application of the UVB, YI was measured, and the test result in which ΔYI was 1 or less was considered to be satisfactory.

<Heat Resistance Test>

The present test was carried out, using a test piece, the resin layer (A) of which had been hard-coated. The test piece was cut to a rectangle with a size of 100×200 mm, and the whole circumference that was located 10 mm inside the periphery of the test piece was linearly damaged with a cutter. The resulting test piece was set into a dryer, which had been heated to a predetermined temperature, such that one angle of the test piece was hung in the dryer. The test piece was left for 30 minutes, and was then removed from the dryer. The test result, in which the temperature was 120° C. or higher when no cracks were generated within the above prepared framework, was considered to be satisfactory.

<Coating Adhesion Test>

The present test was carried out, using a test piece to which a hard coat a2 was applied. The test piece was cut to a rectangle with a size of 100 cm×60 mm. The whole circumference that was located 1 cm inside the periphery of the test piece was linearly damaged with a cutter. The test piece was set into a holder, and it was then placed into an environmental testing machine in which the temperature was set at 85° C. and the relative humidity was set at 85%. Thereafter, 24, 48, 72 and 120 hours later, each test piece was removed from the testing machine, and 25 crosscuts were made on the test piece using a cutter. Thereafter, a tape peeling test was carried out from four directions. The crosscut portion was confirmed by visual observation, and when all of the 25 crosscuts were not peeled 120 hours later, the test result was considered to be satisfactory.

Synthesis Example 1 <Synthesis of Methacrylate Resin (C1)>

200 parts by mass of deionized water, 0.5 parts by mass of calcium triphosphate used as a suspension stabilizer, and 0.01 part by mass of sodium dodecylbenzenesulfonate used as a surfactant were added to a heating-possible high-pressure reactor equipped with a stirring device, and the obtained mixture was then stirred. Separately, 15 parts by mass of 4-phenylbenzyl methacrylate, 82 parts by mass of methyl methacrylate, 3 parts by mass of methyl acrylate, 0.3 parts by mass of PERBUTYL E (manufactured by NOF CORPORATION) used as an initiator, and 1.8 parts by mass of n-octylmercaptan used as a chain-transfer agent were mixed and homogenized to prepare a monomer solution. The thus prepared monomer solution was added to the reactor. The reactor was filled with nitrogen, and the pressure was increased to 0.1 MPa. The reaction was carried out at 110° C. for 1 hour, and then at 120° C. for 2 hours, so as to complete a polymerization reaction. The obtained bead-shaped polymer was washed with water, and was then dried to obtain a methacrylate resin (C1). The mass average molecular weight of the obtained methacrylate resin (C1) was 14,000.

Synthesis Example 2 <Synthesis of Methacrylate Resin (C2)>

A methacrylate resin (C2) was obtained by the same method as that of Synthesis Example 1, with the exception that 10% by mass of 4-phenylbenzyl methacrylate and 87% by mass of methyl methacrylate were used. The mass average molecular weight of the obtained methacrylate resin (C2) was 13,800.

Production Example 1 [Production of Laminated Resin (A11) Pellets]

30% by mass of the (meth)acrylate copolymer (C1) synthesized in Synthesis Example 1 (mass average molecular weight: 14,000), and 70% by mass of the polycarbonate (D) that was Iupilon E-2000 (manufactured by Mitsubishi Engineering-Plastics Corporation; viscosity average molecular weight: 27,000) were mixed with each other using a blender for 30 minutes. Thereafter, using a twin-screw extruder with a screw diameter of 26 mm (TEM-26SS, manufactured by Toshiba Machine Co., Ltd.; L/D≈40), the reaction mixture was melted and kneaded at a cylinder temperature of 260° C., and was then extruded into a strand form. Using a pelletizer, the resultant was processed into pellets. The pellets could be stably produced. The glass transition temperature of the obtained pellets was 123° C.

Production Example 2 [Production of Laminated Resin (A12) Pellets]

Pelletization was carried out in the same manner as that of Production Example 1, with the exception that the mixing ratio between the (meth)acrylate copolymer (C1) and the polycarbonate (D) was set at 40:60. The pellets could be stably produced. The glass transition temperature of the obtained pellets was 117° C.

Production Example 3 [Production of Laminated Resin (A13) Pellets]

Pelletization was carried out in the same manner as that of Production Example 1, with the exception that the mixing ratio between the (meth)acrylate copolymer (C1) and the polycarbonate (D) was set at 20:80. The pellets could be stably produced. The glass transition temperature of the obtained pellets was 128° C.

Production Example 4 [Production of Laminated Resin (A14) Pellets]

30% by mass of the (meth)acrylate copolymer (C2) synthesized in Synthesis Example 2 (mass average molecular weight: 13,800), and 70% by mass of the polycarbonate (D) that was Iupilon E-2000 (manufactured by Mitsubishi Engineering-Plastics Corporation; viscosity average molecular weight: 27,000) were mixed with each other using a blender for 30 minutes. Thereafter, using a twin-screw extruder with a screw diameter of 26 mm (TEM-26SS, manufactured by Toshiba Machine Co., Ltd.; L/D≈40), the reaction mixture was melted and kneaded at a cylinder temperature of 260° C., and was then extruded into a strand form. Using a pelletizer, the resultant was processed into pellets. The pellets could be stably produced. The glass transition temperature of the obtained pellets was 123° C.

Production Example 5 [Production of Laminated Resin (A15) Pellets]

Pelletization was carried out in the same manner as that of Production Example 1, with the exception that the mixing ratio between the (meth)acrylate copolymer (C2) and the polycarbonate (D) was set at 20:80. The pellets could be stably produced. The glass transition temperature of the obtained pellets was 129° C.

Production Example 6 [Production of Thermosetting Resin Composition (a1) to be Coated on Resin Layer (A)]

100 parts by mass of methyltrimethoxysilane and 1 part by mass of acetic acid were added to a mixing tank equipped with an impeller and a dropping device, and they were then mixed with each other. The obtained mixture was cooled in an ice water bath, and was then stirred, while the temperature was retained at 0° C. to 10° C. Subsequently, 84 parts by mass of a solution of 30 wt % colloidal silica having a mean particle diameter of 10 to 20 nm (manufactured by Nissan Chemical Industries, Ltd.; trade name: SNOWTEX 30) was added dropwise to the reaction mixture, and the thus obtained mixture was then stirred for 4 hours, while the temperature was retained at 10° C. Thereafter, 84 parts by mass of a solution of 25 to 26 wt % colloidal silica having a mean particle diameter of 10 to 20 nm (manufactured by Nissan Chemical Industries, Ltd.; trade name: SNOWTEX IBA-ST) was further added dropwise to the reaction mixture, and the thus obtained mixture was then stirred for 50 hours, while the temperature was retained at 20° C. Thereafter, a mixture consisting of 45 parts by mass of cellosolve acetate, 50 parts by mass of isobutyl alcohol and 0.02 parts by mass of a polyoxyalkylene glycol dimethyl siloxane copolymer (manufactured by Shin-Etsu Chemical Co., Ltd.; trade name: KP-341) was added dropwise to the reaction mixture over 1 hour, while the temperature was retained at 25° C., and 2,4-dihydroxybenzophenone was then added in an amount of 10 parts by mass based on 100 parts by mass of the resin, so as to obtain a thermosetting resin composition (a1).

Production Example 7 [Production of Light-Setting Resin Composition (a2) to be Coated on Resin Layer (A)]

A composition consisting of 60 parts by mass of tris(2-acryloyloxyethyl) isocyanurate (manufactured by Aldrich), 40 parts by mass of neopentyl glycol oligoacrylate (manufactured by Osaka Organic Chemical Industry Ltd., trade name: 215D), 1 part by mass of 2,4,6-trimethylbenzoyldiphenylphosphine oxide (manufactured by Ciba Japan, trade name: DAROCUR TPO), 0.3 parts by mass of 1-hydroxy-cyclohexyl phenyl ketone (manufactured by Aldrich) and 1 part by mass of 2-(2H-benzotriazol-2-yl)-4,6-bis(1-methyl-1-phenylethyl)phenol (manufactured by Ciba Japan, trade name: TINUVIN 234) was introduced into a mixing tank equipped with an impeller. Thereafter, the composition was stirred for 1 hour, while the temperature was kept at 40° C., to obtain a light-setting resin composition (a2).

Production Example 8 [Production of Light-Setting Resin Composition (b) to be Coated on Base Material Layer (B)]

A composition consisting of 40 parts by mass of 1,9-nonanediol diacrylate (manufactured by Osaka Organic Chemical Industry Ltd., trade name: Viscoat #260), 40 parts by mass of a hexafunctional urethane acrylate oligomer (manufactured by Shin-Nakamura Chemical Co., Ltd., trade name: U-6HA), 20 parts by mass of a condensate, in which the molar ratio of succinic acid/trimethylolethane/acrylic acid was 1/2/4, 2.8 parts by mass of 2,4,6-trimethylbenzoyldiphenylphosphine oxide (manufactured by Ciba Japan, trade name: DAROCUR TPO), 1 part by mass of benzophenone (manufactured by Aldrich) and 1 part by mass of 2-(2H-benzotriazol-2-yl)-4,6-bis(1-methyl-1-phenylethyl) phenol (manufactured by Ciba Japan, trade name: TINUVIN 234) was introduced into a mixing tank equipped with an impeller. Thereafter, the composition was stirred for 1 hour, while the temperature was retained at 40° C., to obtain a light-setting resin composition (b).

Comparative Production Example 1 [Production of Laminated Resin (A21) Pellets]

30% by mass of the (meth)acrylate copolymer (C3) that was a resin of METABLEN H-880 (mass average molecular weight: 14,000) manufactured by Mitsubishi Rayon Co., Ltd., and 70% by mass of the polycarbonate (D) that was Iupilon E-2000 (manufactured by Mitsubishi Engineering-Plastics Corporation; viscosity average molecular weight: 27,000) were mixed with each other using a blender for 30 minutes. Thereafter, using a twin-screw extruder with a screw diameter of 26 mm (TEM-26SS, manufactured by Toshiba Machine Co., Ltd.; L/D≈40), the reaction mixture was melted and kneaded at a cylinder temperature of 260° C., and was then extruded into a strand form. Using a pelletizer, the resultant was processed into pellets. The pellets could be stably produced. The glass transition temperature of the obtained pellets was 123° C.

Example 1

A synthetic resin laminate was molded using a multilayer extrusion apparatus having a single-screw extruder with a screw diameter of 40 mm, a single-screw extruder with a screw diameter of 75 mm, a feed block connected with both extruders, and a T die connected with the feed block. The laminated resin (A11) obtained in Production Example 1 was continuously introduced into the single-screw extruder with a screw diameter of 40 mm, and it was then extruded under conditions of a cylinder temperature of 240° C. and a discharge rate of 4.5 kg/h. At the same time, the polycarbonate resin (B1) (manufactured by Mitsubishi Engineering-Plastics Corporation; trade name: Iupilon S-1000; viscosity average molecular weight: 25,000 was continuously introduced into the single-screw extruder with a screw diameter of 75 mm, and it was then extruded under conditions of a cylinder temperature of 270° C. and a discharge rate of 70.0 kg/h. The feed block connected with both extruders comprised two types of two-layer distribution pins, and the laminated resin (A11) and the polycarbonate resin (B11) were introduced therein at a temperature of 270° C., and were then laminated. Through the T die with a temperature of 270° C. connected with the feed block, the laminate was extruded in the form of a sheet. Thereafter, the laminate was cooled, while a mirror surface thereof was transcribed with three mirror surface finishing rolls having temperatures of 130° C., 130° C. and 130° C. from the upstream side, thereby obtaining a laminate (E1) of the resin (A11) and the polycarbonate resin (B1). The thickness of the obtained laminate was 1.0 mm, and the thickness of the layer (A11) was 60 μm around the center thereof. The result of the high-temperature and high-humidity exposure test was satisfactory (20.0 μm), the result of the pencil scratch hardness test was also satisfactory (F), and the result of the impact resistance test was also satisfactory (2.3 J or more). The comprehensive judgment was satisfactory.

Example 2

A laminate (E2) comprising the laminated resin (A11) and the polycarbonate resin (B1) was obtained in the same manner as that of Example 1, with the exception that the discharge rate of the laminated resin (A11) used in Example 1 was set at 4.5 kg/h and the discharge rate of the polycarbonate resin (B1) was set at 58 kg/h. The thickness of the obtained laminate was 0.8 mm, and the thickness of the layer (A11) was 60 μm around the center thereof. The result of the high-temperature and high-humidity exposure test was satisfactory (40.0 μm); the result of the pencil scratch hardness test was also satisfactory (F), and the result of the impact resistance test was also satisfactory (2.3 J or more). The comprehensive judgment was satisfactory.

Example 3

A laminate (E3) comprising the laminated resin (A11) and the polycarbonate resin (B1) was obtained in the same manner as that of Example 1, with the exception that the discharge rate of the laminated resin (A11) used in Example 1 was set at 4.5 kg/h and the discharge rate of the polycarbonate resin (B1) was set at 86 kg/h. The thickness of the obtained laminate was 1.2 mm, and the thickness of the layer (A11) was 60 μm around the center thereof. The result of the high-temperature and high-humidity exposure test was satisfactory (10.0 μm), the result of the pencil scratch hardness test was also satisfactory (F), and the result of the impact resistance test was also satisfactory (2.3 J or more). The comprehensive judgment was satisfactory.

Example 4

Using a bar coater, the thermosetting resin composition (a1) obtained in Production Example 6 was applied onto the layer (A11) of the laminate (E1) obtained in Example 1, so that the thickness of the coated film after completion of hardening became 3 to 8 μm. The laminate was dried at 25° C. for 15 minutes, and it was then hardened with a hot air circulation dryer, which had been set at 130° C., for 1 hour, so as to obtain a laminate (F1) comprising a hard coat (a1) on the layer (A11) thereof. The result of the high-temperature and high-humidity exposure test was satisfactory (150 μm), the result of the pencil scratch hardness test was also satisfactory (4H), the result of the impact resistance test was also satisfactory (2.3 J), and the heat resistance was also satisfactory (130° C.). The comprehensive judgment was satisfactory.

Example 5

Using a bar coater, the light-setting resin composition (a2) obtained in Production Example 7 was applied onto the layer (A11) of the laminate (E1) obtained in Example 1 so that the thickness of the coated film after completion of hardening became 3 to 8 μm. After that, the resultant was coated with a PET film, and they were then connected to each other by pressure bonding. Subsequently, using a conveyor equipped with a high-pressure mercury lamp having a light source distance of 12 cm and an output of 80 W/cm, ultraviolet light was applied to the laminate at a line speed of 1.5 m/min, so that the laminate was hardened. Then, the PET film was removed from the laminate, so as to obtain a laminate (F2) comprising a hard coat (a2) on the layer (A11). The result of the high-temperature and high-humidity exposure test was satisfactory (180 μm), the result of the pencil scratch hardness test was also satisfactory (3H), and the result of the impact resistance test was also satisfactory (2.3 J). The light resistance was satisfactory (0.4), the heat resistance was also satisfactory (130° C.), and the coating adhesion was also satisfactory (120 hours or longer). The comprehensive judgment was satisfactory.

Example 6

Using a bar coater, the light-setting resin composition (a2) obtained in Production Example 7 was applied onto the layer (A11) of the laminate (E1) obtained in Example 1, so that the thickness of the coated film after completion of hardening became 3 to 8 μm. After that, the resultant was coated with a PET film, and they were then connected to each other by pressure bonding. At the same time, using a bar coater, the light-setting resin composition (b) obtained in Production Example 8 was applied onto the layer (B1) of the laminate (E1) obtained in Example 1, so that the thickness of the coated film after completion of hardening became 3 to 8 After that, the resultant was coated with a PET film, and they were then connected to each other by pressure bonding. Subsequently, using a conveyor equipped with a high-pressure mercury lamp having a light source distance of 12 cm and an output of 80 W/cm, ultraviolet light was applied to the laminate at a line speed of 1.5 m/min, so that the laminate was hardened. Then, the PET film was removed from the laminate, so as to obtain a laminate (F3) comprising hard coats (a2) and (b) on the layers (A11) and (B1), respectively. The result of the high-temperature and high-humidity exposure test was satisfactory (70 μm), the result of the pencil scratch hardness test was also satisfactory (3H), and the result of the impact resistance test was also satisfactory (1.90 J). The light resistance was satisfactory (0.4), the heat resistance was also satisfactory (130° C.), and the coating adhesion was also satisfactory (120 hours or longer). The comprehensive judgment was satisfactory.

Example 7

A laminate (F4) comprising the hard coat (a1) on the layer (A11) thereof was obtained in the same manner as that of Example 3, with the exception that the laminate (E2) obtained in Example 2 was used instead of the laminate (E1) used in Example 4 (which was obtained in Example 1). The result of the high-temperature and high-humidity exposure test was satisfactory (200 μm), the result of the pencil scratch hardness test was also satisfactory (4H), the result of the impact resistance test was also satisfactory (2.0 J), and the heat resistance was also satisfactory (130° C.). The comprehensive judgment was satisfactory.

Example 8

A laminate (F5) comprising the hard coat (a2) on the layer (A11) thereof was obtained in the same manner as that of Example 4, with the exception that the laminate (E2) obtained in Example 2 was used instead of the laminate (E1) used in Example 4 (which was obtained in Example 1). The result of the high-temperature and high-humidity exposure test was satisfactory (210 μm), the result of the pencil scratch hardness test was also satisfactory (3H), and the result of the impact resistance test was also satisfactory (2.0 J). The light resistance was satisfactory (0.4), the heat resistance was also satisfactory (130° C.), and the coating adhesion was also satisfactory (120 hours or longer). The comprehensive judgment was satisfactory.

Example 9

A laminate (F6) comprising the hard coats (a2) and (b) on the layers (A11) and (B1) thereof, respectively, was obtained in the same manner as that of Example 5, with the exception that the laminate (E2) obtained in Example 2 was used instead of the laminate (E1) used in Example 4 (which was obtained in Example 1). The result of the high-temperature and high-humidity exposure test was satisfactory (120 μm), the result of the pencil scratch hardness test was also satisfactory (3H), and the result of the impact resistance test was also satisfactory (1.8 J). The light resistance was satisfactory (0.4), the heat resistance was also satisfactory (130° C.), and the coating adhesion was also satisfactory (120 hours or longer). The comprehensive judgment was satisfactory.

Example 10

A laminate (F7) comprising the hard coat (a1) on the layer (A11) thereof was obtained in the same manner as that of Example 3, with the exception that the laminate (E3) obtained in Example 3 was used instead of the laminate (E1) used in Example 4 (which was obtained in Example 1). The result of the high-temperature and high-humidity exposure test was satisfactory (100 μm), the result of the pencil scratch hardness test was also satisfactory (4H), the result of the impact resistance test was also satisfactory (2.3 J), and the heat resistance was also satisfactory (130° C.). The comprehensive judgment was satisfactory.

Example 11

A laminate (F8) comprising the hard coat (a2) on the layer (A11) thereof was obtained in the same manner as that of Example 4, with the exception that the laminate (E3) obtained in Example 3 was used instead of the laminate (E1) used in Example 4 (which was obtained in Example 1). The result of the high-temperature and high-humidity exposure test was satisfactory (130 μm), the result of the pencil scratch hardness test was also satisfactory (3H), and the result of the impact resistance test was also satisfactory (2.3 J). The light resistance was satisfactory (0.4), the heat resistance was also satisfactory (130° C.), and the coating adhesion was also satisfactory (120 hours or longer). The comprehensive judgment was satisfactory.

Example 12

A laminate (F9) comprising the hard coats (a2) and (b) on the layers (A11) and (B1) thereof, respectively, was obtained in the same manner as that of Example 5, with the exception that the laminate (E3) obtained in Example 3 was used instead of the laminate (E1) used in Example 4 (which was obtained in Example 1). The result of the high-temperature and high-humidity exposure test was satisfactory (50 μm), the result of the pencil scratch hardness test was also satisfactory (3H), and the result of the impact resistance test was also satisfactory (2.3 J). The light resistance was satisfactory (0.4), the heat resistance was also satisfactory (130° C.), and the coating adhesion was also satisfactory (120 hours or longer). The comprehensive judgment was satisfactory.

Example 13

A laminate (E4) comprising the laminated resin (A12) and the polycarbonate resin (B1) was obtained in the same manner as that of Example 1, with the exception that the laminated resin (A12) obtained in Production Example 2 was used instead of the laminated resin (A11) used in Example 1. The thickness of the obtained laminate was 1.0 mm, and the thickness of the layer (A12) was 60 μm around the center thereof. The result of the high-temperature and high-humidity exposure test was satisfactory (20 μm), the result of the pencil scratch hardness test was also satisfactory (H), and the result of the impact resistance test was also satisfactory (2.3 J or more). The comprehensive judgment was satisfactory.

Example 14

A laminate (E5) comprising the laminated resin (A13) and the polycarbonate resin (B1) was obtained in the same manner as that of Example 1, with the exception that the laminated resin (A13) obtained in Production Example 3 was used instead of the laminated resin (A11) used in Example 1. The thickness of the obtained laminate was 1.0 mm, and the thickness of the layer (A13) was 60 μm around the center thereof. The result of the high-temperature and high-humidity exposure test was satisfactory (15 μm), the result of the pencil scratch hardness test was also satisfactory (F), and the result of the impact resistance test was also satisfactory (2.3 J or more). The comprehensive judgment was satisfactory.

Example 15

A laminate (E6) comprising the laminated resin (A14) and the polycarbonate resin (B1) was obtained in the same manner as that of Example 1, with the exception that the laminated resin (A14) obtained in Production Example 4 was used instead of the laminated resin (A11) used in Example 1. The thickness of the obtained laminate was 1.0 mm, and the thickness of the layer (A14) was 60 μm around the center thereof. The result of the high-temperature and high-humidity exposure test was satisfactory (20 μm), the result of the pencil scratch hardness test was also satisfactory (H), and the result of the impact resistance test was also satisfactory (2.3 J or more). The comprehensive judgment was satisfactory.

Example 16

A laminate (F10) comprising the hard coats (a2) and (b) on the layers (A12) and (B1) thereof, respectively, was obtained in the same manner as that of Example 5, with the exception that the laminate (E4) obtained in Example 13 was used instead of the laminate (E1) used in Example 5 (which was obtained in Example 1). The result of the high-temperature and high-humidity exposure test was satisfactory (100 μm), the result of the pencil scratch hardness test was also satisfactory (4H), and the result of the impact resistance test was also satisfactory (1.8 J). The light resistance was satisfactory (0.4), the heat resistance was also satisfactory (130° C.), and the coating adhesion was also satisfactory (120 hours or longer). The comprehensive judgment was satisfactory.

Example 17

A laminate (F11) comprising the hard coats (a2) and (b) on the layers (A13) and (B1) thereof, respectively, was obtained in the same manner as that of Example 5, with the exception that the laminate (E5) obtained in Example 14 was used instead of the laminate (E1) used in Example 5 (which was obtained in Example 1). The result of the high-temperature and high-humidity exposure test was satisfactory (90 μm), the result of the pencil scratch hardness test was also satisfactory (3H), and the result of the impact resistance test was also satisfactory (2.3 J). The light resistance was satisfactory (0.4), the heat resistance was also satisfactory (130° C.), and the coating adhesion was also satisfactory (120 hours or longer). The comprehensive judgment was satisfactory.

Example 18

A laminate (F12) comprising the hard coats (a2) and (b) on the layers (A14) and (B1) thereof, respectively, was obtained in the same manner as that of Example 5, with the exception that the laminate (E6) obtained in Example 14 was used instead of the laminate (E1) used in Example 5 (which was obtained in Example 1). The result of the high-temperature and high-humidity exposure test was satisfactory (70 μm), the result of the pencil scratch hardness test was also satisfactory (4H), and the result of the impact resistance test was also satisfactory (1.8 J). The light resistance was satisfactory (0.4), the heat resistance was also satisfactory (130° C.), and the coating adhesion was also satisfactory (120 hours or longer). The comprehensive judgment was satisfactory.

Example 19

A laminate (E7) comprising the laminated resin (A15) and the polycarbonate resin (B1) was obtained in the same manner as that of Example 1, with the exception that the laminated resin (A15) obtained in Production Example 5 was used instead of the laminated resin (A11) used in Example 1. The thickness of the obtained laminate was 1.0 mm, and the thickness of the layer (A15) was 60 μm around the center thereof. The result of the high-temperature and high-humidity exposure test was satisfactory (20 μm), the result of the pencil scratch hardness test was also satisfactory (F), and the result of the impact resistance test was also satisfactory (2.3 J or more). The comprehensive judgment was satisfactory.

Example 20

A laminate (E8) comprising the laminated resin (A15) and the polycarbonate resin (B1) was obtained in the same manner as that of Example 2, with the exception that the laminated resin (A15) obtained in Production Example 5 was used instead of the laminated resin (A11) used in Example 2. The thickness of the obtained laminate was 0.8 mm, and the thickness of the layer (A15) was 60 μm around the center thereof. The result of the high-temperature and high-humidity exposure test was satisfactory (20 μm), the result of the pencil scratch hardness test was also satisfactory (F), and the result of the impact resistance test was also satisfactory (2.3 J or more). The comprehensive judgment was satisfactory.

Example 21

A laminate (F13) comprising the hard coats (a2) and (b) on the layers (A15) and (B1) thereof, respectively, was obtained in the same manner as that of Example 5, with the exception that the laminate (E7) obtained in Example 19 was used instead of the laminate (E1) used in Example 5 (which was obtained in Example 1). The result of the high-temperature and high-humidity exposure test was satisfactory (70 μm), the result of the pencil scratch hardness test was also satisfactory (4H), and the result of the impact resistance test was also satisfactory (2.0 J). The light resistance was satisfactory (0.4), the heat resistance was also satisfactory (130° C.), and the coating adhesion was also satisfactory (120 hours or longer). The comprehensive judgment was satisfactory.

Example 22

A laminate (E9) comprising the laminated resin (A15) and the polycarbonate resin (B1) was obtained in the same manner as that of Example 1, with the exceptions that the laminated resin (A11) used in Example 1 was changed to the laminated resin (A15), that the discharge rate of the laminated resin (A15) was set at 4.5 kg/h, and that the discharge rate of the polycarbonate resin (B1) was set at 58 kg/h. The thickness of the obtained laminate was 0.5 mm, and the thickness of the layer (A15) was 60 µm around the center thereof. The result of the high-temperature and high-humidity exposure test was satisfactory (150 µm), the result of the pencil scratch hardness test was also satisfactory (F), and the result of the impact resistance test was also satisfactory (1.8 J). The comprehensive judgment was satisfactory.

Example 23

A laminate (F14) comprising the hard coats (a2) and (b) on the layers (A15) and (B1) thereof, respectively, was obtained in the same manner as that of Example 5, with the exception that the laminate (E9) obtained in Example 22 was used instead of the laminate (E1) used in Example 5 (which was obtained in Example 1). The result of the high-temperature and high-humidity exposure test was satisfactory (400 µm), the result of the pencil scratch hardness test was also satisfactory (3H), and the result of the impact resistance test was also satisfactory (1.0 J). The light resistance was satisfactory (0.4), the heat resistance was also satisfactory (130° C.), and the coating adhesion was also satisfactory (120 hours or longer). The comprehensive judgment was satisfactory.

Comparative Example 1

A laminate (E10) comprising the laminated resin (A3) and the polycarbonate resin (B1) was obtained in the same manner as that of Example 1, with the exceptions that an MS resin (A3) (MS resin, manufactured by NIPPON STEEL & SUMIKIN CHEMICAL CO., LTD.; trade name: MS 600) was used instead of the laminated resin (A11) used in Example 1, and that the cylinder temperature of a single-screw extruder with a screw diameter of 40 mm was set at 220° C. The thickness of the obtained laminate was 1.0 mm, and the thickness of the layer (A3) was 60 µm around the center thereof. Moreover, a laminate (F15) comprising the hard coats (a2) and (b) on the layers (A3) and (B1) of the laminate (E18) was obtained in the same manner as that of Example 5. The result of the high-temperature and high-humidity exposure test was unsatisfactory (400 µm), the result of the impact resistance test was also unsatisfactory (0.7 J), and the heat resistance was also unsatisfactory (95° C.). The comprehensive judgment was unsatisfactory.

Comparative Example 2

A laminate (E11) comprising the laminated resin (A3) and the polycarbonate resin (B1) was obtained in the same manner as that of Example 2, with the exceptions that an MS resin (A3) (MS resin, manufactured by NIPPON STEEL & SUMIKIN CHEMICAL CO., LTD.; trade name: MS 600) was used instead of the laminated resin (A11) used in Example 2, and that the cylinder temperature of a single-screw extruder with a screw diameter of 40 mm was set at 220° C. The thickness of the obtained laminate was 0.5 mm, and the thickness of the layer (A3) was 60 µm around the center thereof. The result of the high-temperature and high-humidity exposure test was unsatisfactory (1000 µm), and the result of the impact resistance test was also unsatisfactory (0.19 J). The comprehensive judgment was unsatisfactory.

Comparative Example 3

A laminate (E12) comprising the laminated resin (A4) and the polycarbonate resin (B1) was obtained in the same manner as that of Example 1, with the exception that a methyl polymethacrylate resin (A4) (manufactured by Kuraray Co., Ltd.; trade name: PARAPET HR-L) was used instead of the laminated resin (A11) used in Example 1. The thickness of the obtained laminate was 1.0 mm, and the thickness of the layer (A4) was 60 µm around the center thereof. Moreover, a laminate (F16) comprising the hard coats (a2) and (b) on the layers (A4) and (B1) of the laminate (E12) was obtained in the same manner as that of Example 5. The result of the high-temperature and high-humidity exposure test was unsatisfactory (1200 µm), the result of the impact resistance test was also unsatisfactory (0.4 J), and heat resistance was also unsatisfactory (110° C.). The comprehensive judgment was unsatisfactory.

Comparative Example 4

A laminate (E13) comprising the laminated resin (A4) and the polycarbonate resin (B1) was obtained in the same manner as that of Example 2, with the exception that a methyl polymethacrylate resin (A4) (manufactured by Kuraray Co., Ltd.; trade name: PARAPET HR-L) was used instead of the laminated resin (A11) used in Example 2. The thickness of the obtained laminate was 0.5 mm, and the thickness of the layer (A4) was 60 µm around the center thereof. As a result of the high-temperature and high-humidity exposure test, the result became unmeasurable, and thus, it was unsatisfactory. The result of the impact resistance test was also unsatisfactory (0.15 J). The comprehensive judgment was unsatisfactory.

Comparative Example 5

A laminate (E22) comprising the laminated resin (A5) and the polycarbonate resin (B1) was obtained in the same manner as that of Example 2, with the exception that a polycarbonate resin (A5) (manufactured by Mitsubishi Engineering-Plastics Corporation; trade name: Iupilon H-3000; viscosity average molecular weight: 19,000) was used instead of the laminated resin (A11) used in Example 2. The thickness of the obtained laminate was 0.5 mm. Since the layer (A5) was hardly distinguished from the layer (B1), the thickness of the layer (A5) was unknown. Moreover, a laminate (F) comprising the hard coat (a1) on the layer (A5) of the laminate (E22) was obtained in the same manner as that of Example 3. The result of the high-temperature and high-humidity exposure test was satisfactory (20 µm), but the result of the pencil scratch hardness test was unsatisfactory (HB). The comprehensive judgment was unsatisfactory.

Comparative Example 6

A laminate (E14) comprising the laminated resin (A21) and the polycarbonate resin (B1) was obtained in the same manner as that of Example 1, with the exception that the laminated resin (A21) obtained in Comparative Production Example 1 was used instead of the laminated resin (A11) used in Example 1. The thickness of the obtained laminate was 1.0 mm, and the thickness of the layer (A21) was 60 μm around the center thereof. Moreover, a laminate (F17) comprising the hard coats (a2) and (b) on the layers (A21) and (B1) of the laminate (E14) was obtained in the same manner as that of Example 5. The result of the high-temperature and high-humidity exposure test was satisfactory (70 μm), the result of the impact resistance test was also satisfactory (2.3 J), and the heat resistance was also satisfactory (130° C.). However, in the coating adhesion test, cross-cut peeling occurred in 5/25 for 72 hours, and thus, the result was unsatisfactory. The comprehensive judgment was unsatisfactory.

Effects of Invention

As shown in Tables 1 and 2, it is found that the synthetic resin laminate of the present invention is excellent in terms of shape stability in a high-temperature or high-humidity environment, surface hardness, impact resistance, weather resistance, heat resistance, and coating adhesion.

TABLE 1

| Example | Produced Resin Symbol | Methacrylate Copolymer (C) [% by mass] | Polycarbonate (D) [% by mass] | Water Absorption/% JIS K7209, 23° C. in water for 24 hrs | Glass Transition Point [° C.] | Production of Pellets |
|---|---|---|---|---|---|---|
| Production Example 1 | A11 | Synthesis Example 1 [30%] | Iupilon E-2000 [70%] | 0.28% | 123 | Possible |
| Production Example 2 | A12 | Synthesis Example 1 [40%] | Iupilon E-2000 [60%] | 0.32% | 117 | Possible |
| Production Example 3 | A13 | Synthesis Example 1 [20%] | Iupilon E-2000 [80%] | 0.26% | 128 | Possible |
| Production Example 4 | A14 | Synthesis Example 2 [30%] | Iupilon E-2000 [70%] | 0.28% | 123 | Possible |
| Production Example 5 | A15 | Synthesis Example 2 [20%] | Iupilon E-2000 [80%] | 0.26% | 129 | Possible |
| Comparative Production Example 1 | A21 | METABLEN H-880 [30%] | Iupilon E-2000 [70%] | 0.30% | 123 | Possible |
| | A3 | MS resin: MS 600 | | 0.51% | 95 | Commercially available product |
| | A4 | Methyl polymethacrylate rein: HR-L | | 0.80% | 105 | Commercially available product |
| | A5 | Polycarbonate: Iupilon S-3000 | | 0.30% | 145 | Commercially available product |
| | B1 | Polycarbonate: Iupilon E-2000 | | 0.30% | 145 | Commercially available product |

TABLE 2

| Example | Material (A) [thickness] | Material (B) [thickness] | Hard Coating on Layer (A) | Hard Coating on Layer (B) | Laminate | Shape Stability under exposure to High Temperature and High Humidity [Shape change amount/mm] | Pencil Hardness of Layer (A) | Impact Resistance Dropping Energy (J) | Light Resistance ΔYI | Heat Resistance (° C.) | Coating Adhesion (hrs) |
|---|---|---|---|---|---|---|---|---|---|---|---|
| Example 1 | A11 [60] | B1 [940] | — | — | E1 | 20 | F | 2.3 J or more | — | — | — |
| Example 2 | A11 [60] | B1 [740] | — | — | E2 | 40 | F | 2.3 J or more | — | — | — |
| Example 3 | A11 [60] | B1 [1140] | — | — | E3 | 10 | F | 2.3 J or more | — | — | — |
| Example 4 | A11 [60] | B1 [940] | a1 | — | F1 | 150 | 4H | 2.3 J | — | 130 | — |
| Example 5 | A11 [60] | B1 [940] | a2 | — | F2 | 180 | 3H | 2.3 J | 0.4 | 130 | 120 |
| Example 6 | A11 [60] | B1 [940] | a2 | b1 | F3 | 70 | 3H | 1.9 J | 0.4 | 130 | 120 |
| Example 7 | A11 [60] | B1 [740] | a1 | — | F4 | 200 | 4H | 2.0 J | — | 130 | — |
| Example 8 | A11 [60] | B1 [740] | a2 | — | F5 | 210 | 3H | 2.0 J | 0.4 | 130 | 120 |
| Example 9 | A11 [60] | B1 [740] | a2 | b1 | F6 | 120 | 3H | 1.8 J | 0.4 | 130 | 120 |
| Example 10 | A11 [60] | B1 [1140] | a1 | — | F7 | 100 | 4H | 2.3 J | — | 130 | — |
| Example 11 | A11 [60] | B1 [1140] | a2 | — | F8 | 130 | 3H | 2.3 J | 0.4 | 130 | 120 |
| Example 12 | A11 [60] | B1 [1140] | a2 | b1 | F9 | 50 | 3H | 2.3 J | 0.4 | 130 | 120 |

TABLE 2-continued

| Example | Material (A) [thickness] | Material (B) [thickness] | Hard Coating on Layer (A) | Hard Coating on Layer (B) | Laminate | Shape Stability under exposure to High Temperature and High Humidity [Shape change amount/mm] | Pencil Hardness of Layer (A) | Impact Resistance Dropping Energy (J) | Light Resistance ΔYI | Heat Resistance (° C.) | Coating Adhesion (hrs) |
|---|---|---|---|---|---|---|---|---|---|---|---|
| Example 13 | A12 [60] | B1 [940] | — | — | E4 | 20 | H | 2.3 J or more | — | — | — |
| Example 14 | A13 [60] | B1 [940] | — | — | E5 | 15 | F | 2.3 J or more | — | — | — |
| Example 15 | A14 [60] | B1 [940] | — | — | E6 | 20 | H | 2.3 J or more | — | — | — |
| Example 16 | A12 [60] | B1 [940] | a2 | b1 | F10 | 100 | 4H | 1.8 J | 0.4 | 130 | 120 |
| Example 17 | A13 [60] | B1 [940] | a2 | b1 | F11 | 90 | 3H | 2.3 J | 0.4 | 130 | 120 |
| Example 18 | A14 [60] | B1 [940] | a2 | b1 | F12 | 70 | 4H | 1.8 J | 0.4 | 130 | 120 |
| Example 19 | A15 [60] | B1 [940] | — | — | E7 | 20 | F | 2.3 J or more | — | — | — |
| Example 20 | A15 [60] | B1 [740] | — | — | E8 | 20 | F | 2.3 J or more | — | — | — |
| Example 21 | A15 [60] | B1 [940] | a2 | b1 | F13 | 70 | 4H | 2.0 J | 0.4 | 130 | 120 |
| Example 22 | A15 [60] | B1 [440] | — | — | E9 | 150 | F | 1.8 J | — | — | — |
| Example 23 | A15 [60] | B1 [440] | a2 | b1 | F14 | 400 | 3H | 1.0 J | 0.4 | 130 | 120 |
| Comparative Example 1 | A3 [60] | B1 [940] | a2 | b1 | F15 | 400 | 2H | 0.7 J | 0.4 | 130 | 120 |
| Comparative Example 2 | A3 [60] | B1 [940] | — | — | E11 | 1000 | 2H | 0.19 J | — | — | — |
| Comparative Example 3 | A4 [60] | B1 [940] | a2 | b1 | F16 | 1200 | 4H | 0.4 J | 0.4 | 110 | 120 |
| Comparative Example 4 | A4 [60] | B1 [440] | — | — | E13 | Unmeasurable | 4H | 0.15 J | — | — | — |
| Comparative Example 5 | A5 [60] | B1 [940] | a2 | b1 | F17 | 20 | HB | 2.3 J | 0.4 | 130 | 120 |
| Comparative Example 6 | A21 [60] | B1 [940] | a2 | b1 | F15 | 70 | 4H | 2.3 J | 0.4 | 130 | 48 |

INDUSTRIAL APPLICABILITY

The synthetic resin laminate of the present invention has characteristics in that it is excellent in terms of shape stability in a high-temperature or high-humidity environment, surface hardness, impact resistance, weather resistance and heat resistance, and thus, the present synthetic resin laminate is preferably used as a transparent substrate material, a transparent protective material, etc., and is particularly preferably used as a front plate for the display of office automation equipment or portable electronic equipment, as a touch panel substrate, and further, as a sheet for hot bending.

The invention claimed is:

1. A synthetic resin laminate, which is formed by laminating a resin layer (A) comprising 5% to 55% by mass of a (meth)acrylate copolymer (C) and 95% to 45% by mass of a polycarbonate (D) on one surface or both surfaces of a base material layer (B) comprising polycarbonate, wherein,
in the synthetic resin laminate:
the (meth)acrylate copolymer (C) comprises an aromatic (meth)acrylate unit (c1) represented by the following formula (1) and a methyl methacrylate unit (c2) at a mass ratio (c1/c2) of 5 to 80/20 to 95, and the mass average molecular weight of the (meth)acrylate copolymer (C) is 5,000 to 30,000,

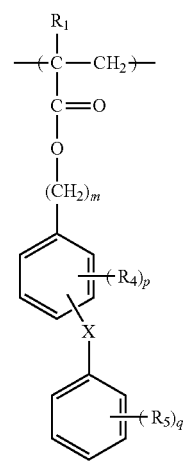

(1)

wherein X represents a divalent group selected from the group consisting of a single bond, —C(R2)(R3)-, —C(=O)—, —O—, —OC(=O)—, —OC(=O)O—, —S—, —SO—, —SO$_2$—, and any given combination thereof (wherein R2 and R3 each independently represent a hydrogen atom, a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a phenyl group, or a phenylphenyl group; R2 and R3 may be connected with each other to form a cyclic alkyl group containing 3 to 10 carbon atoms, together with carbon atoms to which they bind);

R1 represents a hydrogen atom or a methyl group;

R4 and R5 each independently represent a linear alkyl group containing 1 to 10 carbon atoms, a branched alkyl group containing 3 to 10 carbon atoms, a cyclic alkyl group containing 3 to 10 carbon atoms, a linear alkoxy group containing 1 to 10 carbon atoms, a branched alkoxy group containing 3 to 10 carbon atoms, a cyclic alkoxy group containing 3 to 10 carbon atoms, a halogen atom, a phenyl group, or a phenylphenyl group;

m represents an integer of 1 to 10; p represents an integer of 0 to 4; and q represents an integer of 0 to 5;

the viscosity average molecular weight of the polycarbonate (D) is 21,000 to 36,000, wherein the viscosity average molecular weight of the base material layer (B) is 21,000 to 36,000, and wherein the water absorption percentage of the resin layer (A) is 0.05% to 0.5%.

2. The synthetic resin laminate according to claim 1, wherein the glass transition point of the resin layer (A) is 110° C. to 135° C.

3. The synthetic resin laminate according to claim 1, wherein the thickness of the resin layer (A) is 10 to 250 μm, the total thickness (X) of the synthetic resin laminate is 0.1 to 2.0 mm, and the thickness ratio (A)/(X) is 0.01 to 0.5.

4. The synthetic resin laminate according to claim 1, wherein the resin layer (A) and/or the base material layer (B) comprise an ultraviolet absorber.

5. The synthetic resin laminate according to claim 1, wherein the surface of the resin layer (A) is subjected to a hard coating treatment.

6. The synthetic resin laminate according to claim 1, wherein the surface of the resin layer (A) and the surface of the base material layer (B) are subjected to a hard coating treatment.

7. The synthetic resin laminate according to claim 1, wherein any one or more of an antireflection treatment, an antifouling treatment, an anti-fingerprint treatment, an anti-static treatment, a weather resistance treatment, an anti-glare treatment, and a vapor deposition treatment are performed on one surface or both surfaces of the synthetic resin laminate.

8. A transparent substrate material comprising the synthetic resin laminate according to claim 1.

9. A transparent protective material comprising the synthetic resin laminate according to claim 1.

10. The synthetic resin laminate according to claim 1, which is used for an electrode substrate of a touch panel.

11. The synthetic resin laminate according to claim 1, wherein the warp amount of the laminate with a thickness of 1.2 mm or less is 200 μm or less, and the warp amount of the laminate with a thickness of 0.5 mm or less is 300 μm or less;

with proviso that the laminate has been left at a temperature of 23° C. and at a relative humidity of 50% for 24 hours or longer.

12. The synthetic resin laminate according to claim 11, wherein the warp amount of the laminate with a thickness of 1.2 mm or less is 400 μm or less, and the warp amount of the laminate with a thickness of 0.5 mm or less is 500 μm or less;

with the proviso that the laminate has been left at a temperature of 23° C. and at a relative humidity of 50% for 24 hours or longer, and then has been further left at a temperature of 85° C. and at a relative humidity of 85% for 120 hours.

* * * * *